United States Patent [19]

Ananthapadmanabhan et al.

[11] Patent Number: 4,725,358

[45] Date of Patent: Feb. 16, 1988

[54] PROCESS FOR THE SEPARATION OF SOLID PARTICULATE MATTER

[75] Inventors: Kavssery P. Ananthapadmanabhan, Spring Valley, N.Y.; Errol D. Goddard, Haworth, N.J.

[73] Assignee: Union Carbide Corporation, Danbury, Conn.

[21] Appl. No.: 913,498

[22] Filed: Sep. 30, 1986

[51] Int. Cl.$^4$ .............................................. B01D 11/02
[52] U.S. Cl. .................................... 210/634; 210/639
[58] Field of Search .............. 210/511, 634, 639, 643, 210/703

[56] References Cited

U.S. PATENT DOCUMENTS 3,526,585 9/1970 Camp ................................... 210/634
3,740,329 6/1973 Edison .................................. 210/643

FOREIGN PATENT DOCUMENTS 8303971 6/1985 Netherlands.

OTHER PUBLICATIONS

Zvarova, T. I., Liquid-Liquid Extraction in the Absence of Usual Organic Solvents: Application of Two Phase Aqueous Systems Based on a Water Soluble Polymer, Mikrochimica Acta [Wien], Aug. 1984 III, pp. 449-458.

*Primary Examiner*—David Sadowski
*Assistant Examiner*—Jeffrey W. Peterson
*Attorney, Agent, or Firm*—Steven H. Flynn

[57] ABSTRACT

This invention relates to a process for the separation and recovery of particulate matter having an average diameter of about 1 micron or less through the use of aqueous hi-phase systems and the modification of the surface properties of the particulate matter through use of a surfactant to modify its tendency to selectively migrate to one phase of the bi-phase system.

11 Claims, No Drawings

PROCESS FOR THE SEPARATION OF SOLID PARTICULATE MATTER

BACKGROUND OF THE INVENTION

1. Field of the Invention

This invention relates to a process for the separation and subsequent recovery of particulate matter from solution. More particularly, this invention relates to a process for the separation and recovery of particulate matter having an average diameter of about 1 micron or less through the use of bi-phase systems and the modification of the surface properties of said particulate matter to selectively modify its migration to one of the phases of said bi-phase system.

2. Prior Art

The technology relating to the separation and recovery of particulate matter from solution has received increasing attention. This is in part due to the abundance of industrially-produced material and the increased concern regarding its proper disposal.

Numerous technical solutions have been proposed for the concentration and disposal of particulate matter from the various types of waste slimes. The simplest of these techniques involve sedimentation of the particular matter. However, as these methods rely simply upon specific gravity, their utility is limited to the separation of relatively large particles, i.e. larger than about 50 microns.

Filtration technology has also been widely employed. However, these methods have proved to be relatively capital-intensive. Furthermore, small pore filters are typically fragile, unable to handle great volumes of solutions and are more suspectible to clogging. They are therefore not highly useful in the treatment of typical industrial waste streams.

Froth floatation techniques have therefore been developed in an effort to effect satisfactory separations of particulate matter less than 50 microns in diameter. Basically, these techniques involve the addition of reagents, such as surfactants, to the solution in which the particulate matter is contained and the injection of air through the base of a solution containing vessel, thereby causing a frothing of the solution. The particulate matter, bound to air bubbles, rises from solution and may be removed from the vessel along with the froth. Early examples of this technology are disclosed in U.S. Pat. Nos. 835,120 and 962,678.

However, while these techniques have greatly evolved, they continue to possess limitations when dealing with particles of less than about 10 microns in diameter. These limitations are, to varying degrees, associated with at least one of the following phenomena.

A. Fine particles possess large surface areas and therefore processes for their concentration consume large quantities of floatation reagents.

B. Fine particles of one material often agglomerate with larger particles, thereby inhibiting the separation of said fine particles.

C. Floatation rate varies directly with particle size, thereby limiting application of this technology to particles having diameters greater than about 10 microns.

In order to achieve recoveries of particles having smaller diameters, various floation-related techniques have been developed including oil agglomeration and oil floatation. These processes, while allowing recoveries of smaller particles, suffer their own drawbacks due to the relatively high cost of the petroleum-based reagents employed therein and the environmental concerns associated therewith.

A solution to this problem has been proposed in Dutch Patent Application No. 83-03971, published June 17, 1985. The process disclosed therein involves the separation of metal minerals and gangue using a bi-phase aqueous system of an aqueous metal sulfate solution and an aqueous solutions of a polyethylene glycol. It is reported that the lighter gangue particles collect in the upper, polyethylene glycol-containing phase while the metal minerals remain in the metal sulfate solution. While the process effectively solves the environmental concerns due to the absence of toxic, petroleum reagents, the process does not offer selective control of the partition of these materials.

In view of the inadequacies associated with the above-mentioned techniques, there is a need for a method allowing for the separation of particulate matter which does not depend solely upon density considerations, does not employ toxic petroleum-based materials and offers selective modification of the partition of particulate matter.

It is therefore an object of the instant invention to provide a process for the separation of particulate matter which is not density dependent.

It is a further object of the instant invention to provide a process for the separation of particulate matter which does not employ toxic petroleum-based materials.

It is still a further object of the instant invention to provide a process for the separation of particulate matter having diameters of 1 micron or less.

SUMMARY OF THE INVENTION

This invention provide a process for the effective separation and subsequent recovery of particulate matter from solution. More particularly, this invention provides a process for the separation and recovery of particulate matter having average diameters of about 1 micron or less through the use of bi-phase systems and the modification of the surface properties of said particulate matter to selectively modify its migration to one of the phases of said bi-phase system.

DETAILED DESCRIPTION OF THE INVENTION

In accordance with the present invention, the particulate matter which may be concentrated and recovered through use of the claimed process are materials which are insoluble in the common solvent of the bi-phase system and have particle sizes such that their surface chemistry governs their behavior rather than their density. Therefore, particulate matter which may be utilized in the practice of the instant invention should possess average diameters no greater than about 1 micron. Preferably, these materials should have average diameters of less than 1 micron.

Examples of various types of particulate matter which may be concentrated and recovered through the practice of the present invention include, but are not limited to sulfides, phosphates, carbonates, silicates, oxides, cyanides and flourites. In particular, the following materials may be utilized in the practice of the claimed process: galena (PbS), sphalerite (ZnS), cinnabar (HgS), chalcopyrite ($CuFeS_2$), tetrehedrite ($3Cu_2S\cdot Sb_2S_3$), chalcocite ($Cu_2S$), covellite (CuS), borite ($Cu_5FeS_4$), $Fe_2S_3$, apatite ($CaF\cdot Ca_4(PO_4)_3$), $Fe_2S_3$, cuprite ($Cu_2O$), molybdenate, cerussite ($PbCO_3$), anglesite ($PbSO_4$), magntite ($Mn_2O_3\text{-}H_2O$), hematite, silica, calcite, dolomite and psilomelane ($MnO_2$).

The bi-phase systems which may be employed in the instant invention are those which (1) have an aqueous solvent and (2) possess at least two immiscible phases, at least one of which will interact with the particulate matter present in solution.

Aqueous multi-phase systems which may be used in the present invention are well known from the separation of biological matter. For example, see the *Partition of Cell Particles and Macromolecules* by P. Albertsson, Uppsala, 1st edition (1960), 2nd edition (1971). These systems can be roughly divided into two types; namely those in which the phase-forming materials are polymeric materials and those composed of a single polymeric material in conjunction with an inorganic material. Both types of aqueous systems may be employed.

Examples of multi-phase systems wherein both phase-forming materials are polymeric in nature include, but are not limited to, dextran/water-solube copolymer of sucrose and epichlorohydrin, dextran/hydroxypropyldextran, polyethylene glycol/dextran sulphate, dextran/polyethylene glycol, polypropylene glycol/methoxypolyethylene glycol, polypropylene glycol/polyethylene glycol, polypropylene glycol/polyvinyl alcohol, polypropylene glycol/polyvinyl pyrrioidone, polypropoylene glycol/hydroxypropyldexran, polypropylene glycol/hydroxypropyldextran, polypropylene glycol/dextran, polyethylene glycol/polyvinyl alcohol, polyethylene glycol/polyvinyl pyrrolidone, polyethylene glycol/water-soluble copolymer of sucrose and epichlorohydrin, polyethylene glycol/water-soluble starch, polyethylene glycol/glycogen, polyvinyl alcohol/methyl cellulose, polyvinyl alcohol/hydroxypropyldextran, polyvinyl alcohol/dextran, polyvinyl pyrrolidone/methyl cellulose, polyvinyl pyrrolidone/dextran, methyl cellulose/hydroxypropyldextran, methyl cellulose/dextran and ethylhydroxyethyl cellulose/dextran.

Aqueous multi-phase systems which are employable in the present invention which are composed of a polymeric material and at least one inorganic material are also well known in the art. The polymeric materials include copolymers of $C_{1-3}$ alkylene oxides and polyalkylene glycols such as polyethylene glycol, polypropylene glycols, polyvinyl alcohol, polyvinyl pyrrolidone. Representative examples of inorganic salts which may be employed to form multi-phase systems with the above-listed polymeric materials include alkali metal and alkaline earth metal citrates, carbonates, silicates, sulfates, formates, succinates, tartarates and phosphates. Ammonium and potassium salts of these anionic materials may also be employed.

The systems can further contain additional materials including pH buffers, such as lime, tris(hyroxymethyl)-aminomethane, morpholine ethane sulfonate and citrate. Substances which serve to modify the pH of the system may also be employed as long as they do not unduly degrade the other components of the system.

The multi-phase system employed will, of course, depend upon the particulate matter which one wishes to recover as well as other considerations such as the compatibility of the phase-forming materials with any other components contained in the particulate matter-containing solution. For example, the solvent of the multi-phase system must be miscible with the solvent of the particulate matter-containing solution. Economic considerations will also be a factor. Simple experimentation will identify the best systems for each type of particulate matter. Polyalkylene glycol/alkali metal sulfate aqueous systems have been found to function satisfactorily in the separation and concentration of aqueous streams containing particulate matter. Preferred are such systems containing from about 1 to about 30 wt. % polyethylene glycols having an average molecular weight of about 200 to about 100,000 and from about 1 to about 20 wt.% of sodium sulfate.

The sequence of the formation of the multi-phase system is not critical. The particulate matter-containing solution may be introduced into an established multi-phase system or it may first be introduced with one of the phase-forming materials. However, irrespective of the sequence of introduction of the particulate matter-containing solution, sufficient agitation should then be provided to the final solution to ensure adequate mixing of the multi phase system's components, complete distribution of the components of the system and maximization of the particulate matter partition.

As previously noted, this invention relates to modifying the selective partitioning of particulate matter in multi-phase systems through modification of their surface properties. This involves the use of certain soluble reagents. These reagents will hereinafter be referred to as "PTA's" (phase transfer agents). This modification may be reflected by either an increase or reduction of the partition coefficient of a species of particulate matter in a given system when compared to the partition coefficient of that species of particulate matter without the addition of a PTA.

Phase transfer agents have been heretofore used in the recovery of particulate matter from solution in the field of froth flotation. These reagents are generally known as surfactants and are characertized by certain qualities. They must be (1) possess a site with which the particulate matter may interact, and (2) possess a functionality which will preferentially interact with one of the phase-forming materials. Their interaction with particulate matter is thought to be of an electro-chemical nature. Their interaction with phase forming materials may also depend upon a charge differential, or it may be of a hydrophobic interaction. For example, from the field of bioseparations, it is also known that hydrophobic groups similarly migrate into the polyethylene glycol-rich phase of a polyethylene glycol/inorganic salt multiple-phase system.

The PTA's which are employed in the instant invention are well known in the field of separations of particulate matter. For example, see *Froth Floatation* (50th Aniversity Volume), The American Institute of Mining, Metallurgical and Petroleum Engineers, Inc. 1962. The surfactant must be soluble in the mulitple-phase system. Therefore, the surfactants must be water soluble.

The PTA can be either an anionic, cationic or nonionic surfactant. Cationic and anionic surfactants are typified, respectively, by amine-type surfactants, and carboxylic acids and petroleum sulfonates. Examples of cationic surfactants include $C_{8-22}$ primary amines, such as tallow amine and coco amine. Examples of anionic surfactants include $C_{12-18}$ fatty acids, such as lauric, palmitic, oleic and linoleic acids, as well as water-soluble petroleum sulfonates, such as dodecyl benzene sulfonates. Anionic surfactants also include materials such as chleating agents like alkali metal xanthates which are known to interact with sulfide materials. Nonionic surfactants include ethoxylated alcohols marketed by Union Carbide Corporation order the Tergitol ® designation. Final selection of the PTA will depend upon the type of particulate matter and the conditions, such as pH, that exist in the bi-phase system, such that the PTA will interact with the particulate matter.

The PTA's are employed in concentrations less than that will result in micellization of the surfactant in the system. Furthermore, the PTA's should be employed in concentrations below that at which reverse orientation due to bi-layer formation of the surfactant which would make the particulate matter hydrophilic. Therefore, PTA's are to be employed in concentrations of less than 5.0 wt. %, and preferably, less than 1.0 wt. %, and preferably, less than 1.0 wt. % based upon the weight of the bi-phase system.

The reaction conditions present during the partition procedure are also not critical. The temperature and pH should be maintained within limits so as to no unduly affect the components of the multi-phase system from functioning in their intended manner. For instance, temperatures must be maintained above the point where the fluidity of the phases is affected and below a temperature where degradation of the materials contained therein does occur. Generally, this ranges from about 5° C. to about 100° C. at ambient pressure for aqueous systems.

Similarly, the pH of the system should be maintained at a point where no undesired precipitates form.

It has further been found that the selective partitioning of particulate matter within a given multi-phase system may be modified through selection of PTA's and the proper manipulation of pH. More particularly, the pH of a system can exert a marked effect on the partitioning of a given species particulate matter contained therein by effecting the ability of the particulate matter to interact with and bind to a given PTA. It is believed that this is due to pH-induced changes in the electrochemical character of the particulate matter, thereby modifying its interaction with the PTA. Each type of particulate matter exhibits a net zero charge at a given pH. Varying from that pH will cause the particulate matter to exhibit either a net negative or net positive charge. At a given pH, selection of a PTA will depend upon the net charge exhibited by the particulate matter. Alternately, one cay vary the pH of a system to affect (i.e. kinder or encourage) the intereaction between PTA and particulate matter. Moreover, in systems containing more than one type of particulate matter, it is possible to adjust the pH of the system such that each type of particulate matter exhibits a different net charge. The interaction of each material with a given PTA will therefore differ, resulting in a separation of materials.

Once the system has been allowed to establish distinct phases, the phases may be isolated. Conventional methods may then be employed to recover the particulate matter from the isolated phase. For example, filtration may be employed.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

Examples 1-16 demonstrate the partitioning of various materials with and without the addition of phase transfer agents (PTA's). Examples 1, 5, 9 and 13, which use no PTA's, are outside the scope of the instant invention.

EXAMPLE 1

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of magnetite (iron oxide) having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the iron oxide had migrated to and was concentrated in the lower phase.

EXAMPLE 2

The procedure of Example 1 was repeated expect that, prior to agitation of the system, 0.2 wt. % of alkylbenzene sulfonate was added to the separatory funnel.

A visual inspection of the bi-phase system revealed that the iron oxide had migrated to and was concentrated in the upper phase.

EXAMPLE 3

The procedure of Example 1 was repeated expect that, prior to agitation of the system, 0.05 wt. % of oleic acid was added to the separatory funnel.

A visual inspection of the bi-phase system revealed that the iron oxide had migrated to and was concentrated in the lower phase.

EXAMPLE 4

The procedure of Example 1 was repeated expect that, prior to agitation of the system, 0.2 wt. % of cetyl trimethyl ammonium bromide was added to the separatory funnel.

A visual inspection of the bi-phase system revealed that the iron oxide had migrated to and was concentrated in the lower phase.

EXAMPLE 5

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of silica having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the silica had migrated to and was concentrated in the upper phase.

EXAMPLE 6

The procedure of Example 5 was repeated expect that, prior to agitation of the system, 0.2 wt. % of alkylbenzene sulfonate was added to the separatory funnel.

A visual inspection of the bi-phase system revealed that the silica had migrated to and was concentrated in the upper phase.

EXAMPLE 7

The procedure of Example 5 was repeated expect that, prior to agitation of the system, 0.05 wt. % of oleic acid was added to the separatory funnel.

A visual inspection of the bi-phase system revealed that the silica had migrated to and was concentrated in the upper phase.

EXAMPLE 8

The procedure of Example 5 was repeated expect that, prior to agitation of the system, 0.2 wt. % of cetyl trimethyl ammonium bromide was added to the separatory funnel.

A visual inspection of the bi-phase system revealed that the silica had migrated to and was concentrated in the lower phase.

EXAMPLE 9

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of titanium dioxide having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the titanium dioxide had migrated to and was concentrated in the lower phase.

EXAMPLE 10

The procedure of Example 9 was repeated expect that, prior to agitation of the system, 0.2 wt. % of alkylbenzene sulfonate was added to the separatory funnel.

A visual inspection of the bi-phase system revealed that the titanium dioxide had migrated to and was concentrated in the lower phase.

EXAMPLE 11

The procedure of Example 9 was repeated expect that, prior to agitation of the system, 0.05 wt. % of oleic acid was added to the separatory funnel.

A visual inspection of the bi-phase system revealed that the titanium dioxide had migrated to and was concentrated in the lower phase.

EXAMPLE 12

The procedure of Example 9 was repeated expect that, prior to agitation of the system, 0.2 wt. % of cetyl trimethyl ammonium bromide was added to the separatory funnel.

A visual inspection of the bi-phase system revealed that the titanium dioxide had migrated to and was concentrated in the lower phase.

EXAMPLE 13

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of apatite (calcium phosphate) having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi phase system revealed that the apatite had migrated to and was concentrated in the lower phase.

EXAMPLE 14

The procedure of Example 13 was repeated expect that, prior to agitation of the system, 0.2 wt. % of alkylbenzene sulfonate was added to the separatory funnel.

A visual inspection of the bi-phase system revealed that the apatite had migrated to and was concentrated in the lower phase.

EXAMPLE 15

The procedure of Example 13 was repeated expect that, prior to agitation of the system, 0.05 wt. % of oleic acid was added to the separatory funnel.

A visual inspection of the bi-phase system revealed that the apatite had migrated to and was concentrated in the lower phase.

Examples 17–28 demonstrate the effect of pH on the ability of particulate matter and PTA's to interact.

EXAMPLE 16

The procedure of Example 13 was repeated expect that, prior to agitation of the system, 0.2 wt. % of cetyl trimethyl ammonium bromide was added to the separatory funnel.

A visual inspection of the bi-phase system revealed that the apatite had migrated to and was concentrated in the lower phase.

EXAMPLE 17

An aqueous bi-phase system is formulated in a 50 cc separatory funnel using the components set forth below.
1. 20 cc. of a 15.0 wt. % solution of polyethylene glycol having an average molecular weight of about 3350, (manufactured by Union Carbide and marketed under the designation of CARBOWAX polyethylene glycol 3350, and 2. 20 cc. of a 7.5 wt. % aqueous solution of sodium sulfate.

To said separatory funnel is added about 1 gram of magnetite (iron oxide) having an average particle diameter of 1 micron or less. The contents of the separatory funnel are then agitated to disperse the particulate matter. The funnel is then left undisturbed for a period of about 5 minutes to allow the bi-phase system to reestablish.

A visual inspection of the bi-phase system reveals that the iron oxide migrates to and concentrates in the lower phase.

EXAMPLE 18

The procedure of Example 17 is repeated expect that, prior to agitation of the system, 0.1 wt. % of dodecyl benzene sulfonate is added to the separatory funnel. The pH of the system is found to be 8.3.

A visual inspection of the bi-phase system reveals that the iron oxide migrates to and concentrates in the lower phase.

EXAMPLE 19

The procedure of Example 18 is repeated expect that, prior to agitation of the system, the pH of the system is adjusted to 3.5 through the addition of HCl.

A visual inspection of the bi-phase system revealed that the iron oxide had migrated to and was concentrated in the upper phase.

EXAMPLE 20

An aqueous bi-phase system is formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel is added about 1 gram of silica having an average particle diameter of 1 micron or less. The contents of the separatory funnel are then agitated to disperse the particulate matter. The funnel is then left undisturbed for a period of about 5 minutes to allow the bi-phase system to reestablish.

A visual inspection of the bi-phase system reveal that the silica migrates to and concentrates in the upper phase.

EXAMPLE 21

The procedure of Example 20 is repeated expect that, prior to agitation of the system, 0.1 wt. % of dodecyl benzene sulfonate is added to the separatory funnel. The pH of the system is found to be 8.3.

A visual inspection of the bi-phase system reveals that the silica migrates to and concentrates in the upper phase.

EXAMPLE 22

The procedure of Example 20 is repeated expect that, prior to agitation of the system, the pH of the system is adjusted to 3.5 through the addition of HCl.

A visual inspection of the bi-phase system revealed that the silica migrate to and concentrates in the upper phase.

EXAMPLE 23

An aqueous bi-phase system is formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel is added about 1 gram of titanium dioxide having an average particle diameter of 1 micron or less. The contents of the separatory funnel are then agitated to disperse the particulate matter. The funnel is then left undisturbed for a period of about 5 minutes to allow the bi-phase system to reestablish.

A visual inspection of the bi-phase system reveals that the titanium dioxide migrates to and concentrates in the upper phase.

EXAMPLE 24

The procedure of Example 23 is repeated expect that, prior to agitation of the system, 0.1 wt. % of dodecyl benzene sulfonate is added to the separatory funnel. The pH of the system is found to be 8.3.

A visual inspection of the bi-phase system reveals that the titanium dioxide migrates to and concentrates in the lower phase.

EXAMPLE 25

The procedure of Example 24 is repeated expect that, prior to agitation of the system, the pH of the system is adjusted to 3.5 through the addition of HCl.

A visual inspection of the bi-phase system revealed that the titanium dioxide migrate to and concentrates in the upper phase.

EXAMPLE 26

An aqueous bi-phase system is formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel is added about 1 gram of apatite having an average particle diameter of 1 micron or less. The contents of the separatory funnel are then agitated to disperse the particulate matter. The funnel is then left undisturbed for a period of about 5 minutes to allow the bi-phase system to reestablish.

A visual inspection of the bi-phase system reveals that the apatite migrates to and concentrates in the upper phase.

EXAMPLE 27

The procedure of Example 26 is repeated expect that, prior to agitation of the system, 0.1 wt. % of dodecyl benzene sulfonate is added to the separatory funnel. The pH of the system is found to be 8.3.

A visual inspection of the bi-phase system reveals that the apatite migrates to and concentrates in the upper phase.

EXAMPLE 28

The procedure of Example 27 is repeated expect that, prior to agitation of the system, the pH of the system is adjusted to 3.5 through the addition of HCl.

A visual inspection of the bi-phase system revealed that the apatite migrate to and concentrates in the upper phase.

Examples 29–38 demonstrate the partitioning of various metal sulfides with and without the addition of potassium xanthate. Examples 29, 31, 33, 35 and 37, which do not employ the xanthate additive, are therefore outside the scope of the present invention.

EXAMPLE 29

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of copper sulfide having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the copper sulfide migrated to and was concentrated in the lower phase.

EXAMPLE 30

The procedure of Example 29 was repeated expect that, prior to agitation of the system, 0.01 wt. % of potassium xanthate was added to the separatory funnel. The pH of the system was found to be 6.2.

A visual inspection of the bi-phase system revealed that the copper sulfide migrated to and was concentrated in the upper phase.

EXAMPLE 31

An aqueous bi-phase system was formulated in a 50 cc separatory funnel using the components set forth below.
1. 20 cc of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of lead sulfide having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the lead sulfide migrated to and was concentrated in the lower phase.

EXAMPLE 32

The procedure of Example 31 was repeated expect that, prior to agitation of the system, 0.01 wt. % of potassium xanthate was added to the separatory funnel. The pH of the system was found to be 6.4.

A visual inspection of the bi-phase system revealed that the lead sulfide migrated to and was concentrated in the upper phase.

EXAMPLE 33

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of zinc sulfide having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the zinc sulfide migrated to and was concentrated in the lower phase.

EXAMPLE 34

The procedure of Example 33 was repeated expect that, prior to agitation of the system, 0.01 wt. % of potassium xanthate was added to the separatory funnel. The pH of the system was found to be 6.8.

A visual inspection of the bi-phase system revealed that the zinc sulfide migrated to and was concentrated in the upper phase.

EXAMPLE 35

An aqueous bi-phase system was formulated in a 50 cc separatory funnel using the components set forth below.
1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of iron sulfide having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the iron sulfide migrated to and was concentrated in the lower phase.

EXAMPLE 36

The procedure of Example 35 was repeated expect that, prior to agitation of the system, 0.01 wt. % of potassium xanthate was added to the separatory funnel. The pH of the system was found to be 6.3.

A visual inspection of the bi-phase system revealed that the iron sulfide migrated to and was concentrated in the lower phase.

EXAMPLE 37

An aqueous bi-phase system was formulated in a 50 cc separatory funnel using the components set forth below.

1. 20 cc. of a 15.0 wt. % solution of polyethylene glycol having an average molecular weight of about 3350, (manufactured by Union Carbide Corporation and marketed under the designation of CARBOWAX polyethylene glycol 3350, and
2. 20 cc. of a 7.5 wt. % aqueous solution of sodium sulfate.

To said separatory funnel was added about 1 gram of nickel sulfide having an average particle diameter of 1 micron or less. The contents of the separatory funnel were then agitated to disperse the particulate matter. The funnel was then left undisturbed for a period of about 5 minutes to allow the bi-phase system to reestablish.

A visual inspection of the bi-phase system revealed that the nickel sulfide migrated to and was concentrated in the lower phase.

EXAMPLE 38

The procedure of Example 37 was repeated expect that, prior to agitation of the system, 0.01 wt. % of potassium xanthate was added to the separatory funnel. The pH of the system was found to be 4.7.

A visual inspection of the bi-phase system revealed that the nickel sulfide migrated to and was concentrated in the lower phase.

We claim:

1. A process for the selective concentration and subsequent recovery of solid inorganic particulate material having average diameters of about 1 micron or less from an aqueous solution or solution miscible with an aqueous solution comprising (a) contacting the solid inorganic particulate matter-containing solution with an aqueous bi-phase system,
    (b) providing the bi-phase system with a surfactant, which modifies the selective partitioning of the particular matter in the bi-phase system,
    (c) isolating the phases of the bi-phase system, and
    (d) recovering the solid inorganic particulate matter from the isolated phase of the bi-phase system in which it is concentrated.

2. The process of claim 1 further comprising, prior to step (c), providing the system with a pH such that the concentration of the solid inorganic particulate matter in one of the phases in said bi-phase system is enhanced.

3. The process of claim 1 wherein the average diameter of the solid inorganic particulate matter is less than 1 micron.

4. The process of claim 1 wherein the aqueous bi-phase system comprises aqueous solutions of polyethylene glycol and sodium sulfate.

5. The process of claim 1 wherein the solid inorganic particulate matter is selected from the group consisting of metal sulfides, phosphates, silicates, oxides, cyanides and flourites.

6. The process of claim 5 wherein the solid inorganic particulate matter is selected from the group consisting of iron oxide, silica, titanium dioxide, apatite, copper sulfide, lead sulfide, zinc sulfide, iron sulfide and nickel sulfide.

7. The process of claim 1 wherein the surfactant is selected from the group consisting of carboxylic acids and petroleum sulfonates.

8. The process of claim 1 wherein the surfactant comprises a $C_{8-22}$ primary amine.

9. The process of claim 1 wherein the surfactant comprises an ethoxylated alcohol.

10. The process of claim 1 wherein the surfactant is provided in concentrations of less than 5.0 wt. % based upon the weight of the bi-phase system.

11. The process of claim 10 wherein the surfactant is provided in concentrations of less than 1.0 wt. % based upon the weight of the bi-phase system.

* * * * *